United States Patent
Andreev et al.

(10) Patent No.: US 7,035,844 B2
(45) Date of Patent: Apr. 25, 2006

(54) FFS SEARCH AND EDIT PIPELINE SEPARATION

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 410 days.

(21) Appl. No.: 10/082,687

(22) Filed: Feb. 25, 2002

(65) Prior Publication Data

US 2003/0163442 A1 Aug. 28, 2003

(51) Int. Cl.
*G06F 17/30* (2006.01)

(52) U.S. Cl. ............................................ 707/3; 707/10
(58) Field of Classification Search .................... 707/3, 707/10, 2, 4, 5
See application file for complete search history.

(56) References Cited

U.S. PATENT DOCUMENTS

| | | | | |
|---|---|---|---|---|
| 4,464,718 | A * | 8/1984 | Dixon et al. | 707/3 |
| 5,721,898 | A * | 2/1998 | Beardsley et al. | 707/3 |
| 6,553,370 | B1 * | 4/2003 | Andreev et al. | 707/3 |
| 6,564,211 | B1 * | 5/2003 | Andreev et al. | 707/3 |
| 6,633,865 | B1 * | 10/2003 | Liao | 707/3 |
| 6,678,678 | B1 * | 1/2004 | Lee et al. | 707/3 |
| 6,718,326 | B1 * | 4/2004 | Uga et al. | 707/6 |
| 6,721,732 | B1 * | 4/2004 | Lawton | 707/3 |

OTHER PUBLICATIONS

Mansor et al., FPGA-Based Internet Protocol Version 6 Router, Computer Design: VLSI in Computers and Processors, 1998. ICCD '98. Proceddings., International Conference on, Oct. 5-7, 1998, p. 334-339.*
Colbrook et al., Algorithms for Search Trees on Message Passing Architectures, Parallel and Distributed Systems, IEEE Transactions on, vol. 7 Issue 2, Feb. 1996, p. 97-108.*
Muramatsu et al., Image Processing LSI "ISP-IV" Based on Local Parallel Architecture and its Applications, Image Processing, 1998. ICIP 98. Proceedings. 1998 International Conf. on, Oct. 4-7, 1998, p. 1000-10004 vol. 3.*
IBM Technical Disclosure Bulletin, Parallel Table Directed Translation, TDB-ACC-No. NN79112489, vol. 22, No. 6, Nov. 1979, pp. 2489-2490.*

* cited by examiner

*Primary Examiner*—Greta Robinson
(74) *Attorney, Agent, or Firm*—Suiter-West-Swantz PC LLO

(57) ABSTRACT

The present invention is directed to fast flexible search and edit pipeline separation. A system suitable for providing a search may include a central controller and at least one search engine. The central controller is suitable for implementing search and edit operations. The at least one search engine is communicatively coupled to the central controller. The central controller performs parallel execution of a search operation and an edit operation through utilization of the at least one search engine.

30 Claims, 2 Drawing Sheets

FFS SEARCH AND EDIT PIPELINE SEPARATION

FIELD OF THE INVENTION

The present invention generally relates to the field of search engines, and particularly to fast flexible search and edit pipeline separation.

BACKGROUND OF THE INVENTION

Data communications is most often accomplished by sending a group of data in a packet, together with the address of the location for which the data is intended. For instance, a search for data may be accomplished by conducting a binary search based on the address or prefix where the data are retained, or stored, and the data returned in a packet to the requesting address. The search is conducted by a lookup procedure that matches the query address with the stored address.

However, lookup procedures may be a major source of bottlenecks in high performance compliers and routes. Lookup techniques are used in various compilers such as compilers used in designing semiconductor and integrated circuit chips, and in network applications such as Internet address (URL) lookup in high performance data routers where large search tables or databases are employed. Searching large tables or databases may require increased time or hardware requirements, or both, resulting in more expensive systems in terms of increased search delays and larger memories. Problems associated with such lookups increase with the size of the table or database, may increase with the address length encountered, increase with traffic flow, and the introduction of higher speed links may result in a bottleneck. For example, with use of the next generation IPv6 protocol, which uses 128-bit addresses, such problems may increase as more numerous and longer addresses are encountered.

Additionally, in systems employing present search techniques, edit operations may interfere with search operations, thereby greatly affecting the efficiency and performance of the system as a whole.

Therefore, it would be desirable to provide improved search engine architecture for efficient operation.

SUMMARY OF THE INVENTION

Accordingly, the present invention is directed to fast flexible search and edit pipeline separation. In a first aspect of the present invention, a system suitable for providing a search includes a central controller and at least one search engine. The central controller is suitable for implementing search and edit operations. The at least one search engine is communicatively coupled to the central controller. The central controller performs parallel execution of a search operation and an edit operation through utilization of the at least one search engine.

In a second aspect of the present invention, a search engine suitable for providing a search includes a memory, a priority controller, an edit module, a search module and an address cache. The memory is suitable for storing electronic data and the priority controller is communicatively coupled to the memory. The edit module is communicatively coupled to the priority controller, the edit module configured to perform calculations for an edit operation. The search module is communicatively coupled to the priority controller, the search module configured to perform calculations for a search operation. The address cached is communicatively coupled to the memory and the priority controller, the address cache suitable for storing electronic data. The priority controller manages access to the memory by the edit module, search module and address cache.

In a third aspect of the present invention, a system suitable for providing a search includes a central controller and a plurality of search engines. The central controller is suitable for implementing search and edit operations and suitable for inputting and outputting external communications. The plurality of search engines are arranged in zero through k levels, wherein a k level search engine of the plurality of search engines is communicatively coupled to the central controller and a zero level search engine of the plurality of search engines is communicatively coupled to the central controller. The central controller performs parallel execution of a search operation and an edit operation through utilization of at least one of the plurality of search engines.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
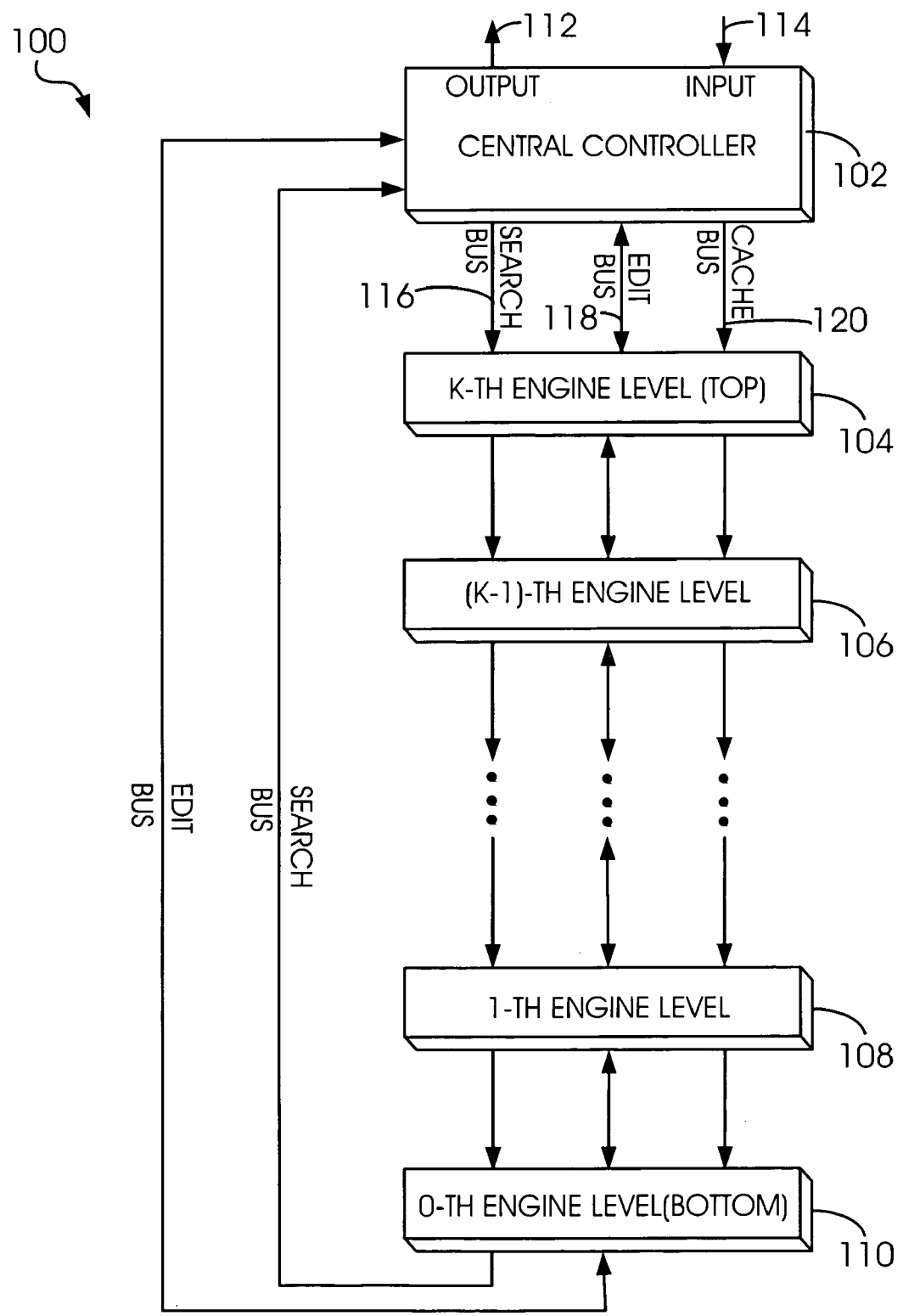
FIG. 1 is a block diagram depicting an exemplary embodiment of the present invention wherein communication between search engine levels is shown.
Figure 2:
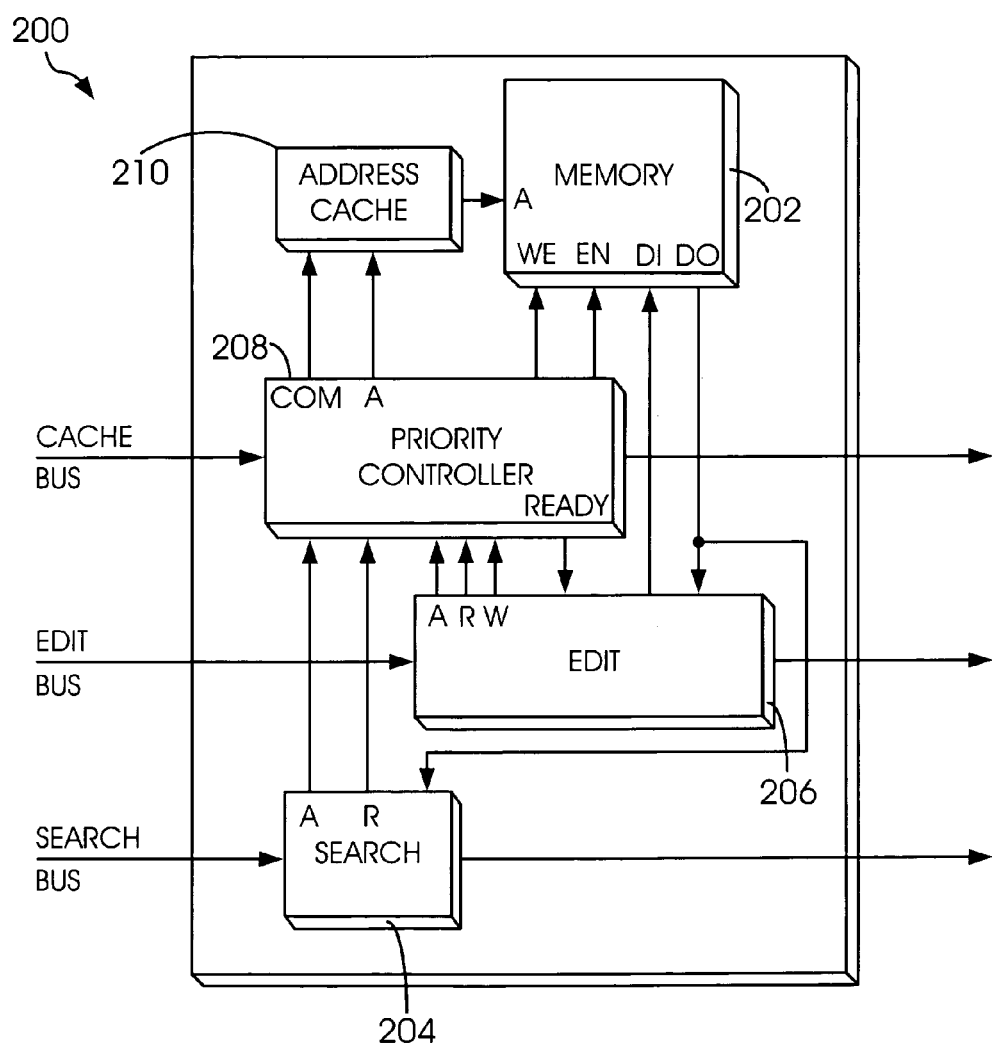
FIG. 2 is a block diagram illustrating an exemplary embodiment of the present invention wherein the structure of one engine stage is shown.

Referring generally now to FIGS. 1 through 2, exemplary embodiments of the present invention are shown. The present invention provides the ability to perform edit operations, such as insert and delete, without interrupting searches being performed at the same time. For instance, this invention may be applied to fast flexible search high speed lookup engines for perfect and longest prefix matches, such as the search engines described in U.S. patent application Ser. No. 09/679,313, titled "Fast Flexible Search Engine for Perfect Match," filed Oct. 4, 2000; and U.S. patent application Ser. No. 09/679,209, titled "Fast Flexible Search Engine for Longest Prefix Match," filed Oct. 4, 2000, which are herein incorporated by reference in their entirety, and is applicable for any search engine with similar pipeline structures, as well as other structures contemplated by a person of ordinary skill in the art without departing from the spirit and scope of the present invention.

For example, a sorted binary search tree may be provided having a fixed number of levels, in which the bottom vertices contain keys and associated data. The hierarchy vertices or nodes may contain one key for each child vertex and a vertex address pointing to the vertex containing that key. The keys are arranged in a predetermined order, such as address order, across the vertices of each level such that a search into a given hierarchy vertex is directed into a specific group of keys. The search tree is structured so that all search paths are the same length. Nodes or vertices may be inserted and deleted at most levels, thereby maintaining the equal length to all search paths. The tree may employ perfect matching techniques which seek a perfect match between the input or query key and the key being sought. If a perfect match is not returned, the search reports a false return.

In some instances of longest prefix searching, the prefix may be any length, such as up to W−1, where W is the maximum length of an address. Since W=32 in IPv4 Protocol and W=128 in IPv6 protocol, the prefix may be any length between 1 and 31 bits in IPv4 protocol and between 1 and 127 bits in IPv6 Protocol. Thus, a vast number of variable-length prefixes may exist in both IPv4 and IPv6 protocols. The number of memory accesses required by traditional perfect match search of variable length prefixes increases with the number of prefixes. Consequently, the number of memory accesses may be large, thereby slowing the search process. One method utilized to address this problem is described in co-pending application titled "Fast Flexible Search Engine for Longest Prefix Match" referenced previously, which describes a system and method for establishing a single length for all prefixes and subprefixes, such as equal to the length of the addresses.

Such improvements may be further utilized through implementation of the present invention. The present invention provides a protocol for search engine operation interaction, which allows the parallel execution of an uninterrupted search stream on one side and one of the edit operations, such as insert and delete, on the other side. Preferably, the execution latency of the search operation remains the same as without simultaneous edit operation. The search operation may start at any clock rate.

Referring now to FIG. 1, an exemplary embodiment of the present invention is shown wherein an architecture and communication between search engine levels is shown. By employing the present invention, a pipeline architecture may be supplied that allows uninterrupted execution of search operations and an insert and delete operation. The present invention may be applied to a variety of search engines, and thus the present discussion will not differentiate the types of the search engine which may be employed, such as perfect, longest prefix match (the pipeline structure is the same for both cases) and like structures as contemplated by a person of ordinary skill in the art.

The engine 100 contains k+1=_numb_level level blocks 104, 106, 108 & 110 and a central controller 102. The number _numb_level is the depth of the search tree, such as a search tree utilized in perfect match search engine. The level index increases from 0 for the bottom tree level 110 to the maximal value k=(_numb_level−1) for the top 104. The top level 104 corresponds to the root tree vertex. Any two neighbor levels are connected in both directions. The central controller 102 is connected with the top 104 and bottom levels 110 in both directions too. The external pins 112 & 114 belong to the central controller 102.

There are three sets of connections: one for the search 116, a second for the edit operation 118 and a third one for control of an address cache 120. In an embodiment, the search connections 116 progress in one direction: from the central controller 102 to the top level 104, from the top level 104 to the (k−1)-th level 106, from (k−1)-th level 106 to 1-th level 108, from the 1-th level 108 to the bottom level 110, and from the bottom level 110 to the central controller 102.

The edit connections 118 may progress in both directions. The cache connections 120 are similar to the search connections, but a signal is not provided from the bottom level to the central controller. The cache bus may be employed utilizing a single wire.

The search bus may contain the following: (1) key for search; (2) address in memory of the next tree vertex; (3) degree of the tree vertex; (4) mask of subprefixes in the longest prefix match case; and like data as contemplated by a person of ordinary skill in the art.

The connection from the bottom level 110 to the central controller 102 may include searched data too. The edit bus has the same field and a few control bits to specify commands from one engine level to another.

In contemplated embodiments, the execution time of edit operation is reciprocally proportional to the input search stream density.

Referring now to FIG. 2, an embodiment of the present invention is shown wherein contents of an exemplary search engine 200 are described. Each engine stage 104, 106, 108 & 110 (FIG. 1) may contain a separate processor and a memory 202. The memory stores vertices of the corresponding tree level. The processor has 4 main parts: a search module 204; an edit module 206; a memory address cache 210; and a priority controller 208. Connections between modules 202, 204, 206, 208 & 210 are shown in FIG. 2.

The search module 204 performs calculations for the search operation. The search module 204 obtains input signals from similar search module of the upper neighbor (previous) level and sends output signals to the search module of the next level. For instance, a search module of the (K−1)-th engine level 106 may obtain output signals from the K-th engine level 104 (FIG. 1). The input of the top search module 104 may be obtained from the central controller 102. The output of the 0-th engine level 110 search module is provided to the central controller 102.

The search module 204 communicates with the memory 202 through the priority controller 208. For instance, the search module 204 may send the address "A" and a control bit "R" to the priority controller 208, which may be 1 if a search is in an active state and zero otherwise. The search module 204 receives a data "DO" from the memory 202.

The edit module 206 performs calculations for insert and delete operations. The edit module has inputs and outputs from both neighboring levels. For instance, referring again to FIG. 1, the (K−1)-th engine level may send and receive data from both the k-th engine level 104 and the 1-th engine level 108. The top and bottom edit modules, as included in the k-th engine level 104 and 0-th engine level 110, have connections with the central controller 102.

The edit module 206 connects with the level memory 202 through the memory controller (priority controller 208). The edit module 206 sends to the priority controller 208 the address "A" and control bits "R" and "W". The bit "R" may be equal to 1, if edit module 206 tries to read from memory 202. The bit "W" is equal to 1 if edit module 206 tries to write into the memory 202. The edit module 206 receives data "DO" from the memory 202 and sends data "DI" to the memory 202. The edit module 206 may also receive signal "READY" from the priority controller 208. If the "READY" signal is equal to 1, the priority controller 208 allows the edit module 206 to access the memory 202.

The priority controller 208 has connections to the memory 202, cache module 210, search module 204 and edit module 206. The priority controller 208 manages accessing by these modules 204, 206 & 210 to the memory. The cache module 210 may modify addresses to provide correct searches.

A problem in separation of the search and edit operations is simultaneous memory access by both types of operations. The edit operation transforms memory content relatively slowly, level by level. Additionally, the search operation is correct only if the edit operation has finished. The present invention addresses these issues through the use of the priority controller 208.

For instance, a search operation requires just read access to the memory. The edit operation needs read and write access to the memory. In a contemplated embodiment, the search operation has priority, and the priority controller 208 allows communication of the edit module 206 with the memory 202 only in the case when search does not read the memory 202.

In order to provide reliable and accurate access by the search operation to the memory 202, controller 208 may access an address cache module 210. For example, if an edit operation requests a read of memory address A1 of the memory 202, the content of memory address A1 is copied to a free address, A2, and pair (A1, A2) is stored in the cache 210, which may include small content addressable memory (CAM). The memory controller is looking for the search address A in the left side of the CAM. If it exists there, for example A=A1, it will be replaced by the right component of the corresponding CAM entry, i.e. A2. This guaranties that a search reads from the memory the same information as before the start of the edit operation.

After the edit operation is finished, the cache may be cleared. To perform this procedure, the central controller may send a signal through the cache bus to the memory controllers. Signal synchronization with the search stream allows the system of the present invention to preserve correctness at this period of time.

Referring again to FIG. 1, the central controller 102 communicates with the outside world. The central controller 102 receives external commands and transfers them to one of the pipelines: search 116 or edit 118. The central controller 102 controls the edit operation's execution and saves the current execution edit command and information associated with it, such as address, data and the like. The central controller 102 may utilize this information to produce the answer for the search operation. From a user point of view, all operations (search, insert, delete) execute in the order received.

In an embodiment of the present invention, the central controller 102 rejects any edit operation issued before the current edit operation is finished. In the case of the insert operation the associated data does not travel through the pipeline. The central controller 102 sends it immediately to the bottom processor.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A computer system for providing a search, comprising:
   a central controller suitable for implementing search and edit operations; and
   at least one search engine communicatively coupled to the central controller, wherein the central controller performs parallel execution of a search operation and an edit operation through utilization of a binary search tree and the at least one search engine; wherein the at least one search engine includes a priority controller, memory, edit module, search module and address cache.

2. The system as described in claim 1, wherein the central controller and at least one engine are communicatively coupled via a search connection, an edit connection and a cache connection.

3. The system as described in claim 1, wherein the priority controller manages access to the memory by the edit module, search module and cache module.

4. The system as described in claim 1, wherein the priority controller accesses data utilizing the address cache, the address cached configured to the address cached configured to receive data from the memory.

5. The system as described in claim 1, wherein the edit module connects with the memory through the priority controller, the edit module configured to perform calculations for editing operations.

6. The system as described in claim 1, wherein the search module is configured to perform calculation for a search operation.

7. The system as described in claim 6, wherein the search module is communicatively connected to a second search module of a second search engine positioned at a neighboring level, the second search engine positioned at least one of at a previous or subsequent level to the search module.

8. The system as described in claim 6, wherein the search engine is a 0th level search engine, output of the search module is provided to the central controller and wherein the search engine is a top search engine, the input of the search module is obtained from the central controller.

9. The system as described in claim 1, wherein the edit module has inputs and outputs from a neighboring search engine level to the search engine.

10. The system as described in claim 1, wherein the priority controller gives priority to a search operation over an edit operation.

11. The system as described in claim 1, wherein the priority controller accesses the address cache to provide parallel access.

12. The system as described in claim 11, wherein the priority controller receives a request to read a memory address of the memory, content of the memory address is copied to a first cache address and a second cache address of the address cache.

13. A search engine suitable for providing a search, comprising:
   a memory suitable for storing electronic data;
   a priority controller communicatively coupled to the memory;
   an edit module communicatively coupled to the priority controller, the edit module configured to perform calculations for an edit operation;
   a search module communicatively coupled to the priority controller, the search module configured to perform calculations for a search operation; and
   an address cache communicatively coupled to the memory and the priority controller, the address cache suitable for storing electronic data;
   wherein the priority controller manages access to the memory by the edit module, search module and address cache, and the search engine provides the search using a binary search tree.

14. The search engine as described in claim 13, wherein the priority controller, through utilization of the address cache enables parallel execution of a search operation and an edit operation as performed by the search module and edit module respectively.

15. The search engine as described in claim 13, wherein the search module is communicatively connected to a second search module of a second search engine position at a neighboring level, the second search engine positioned at least one of at a previous or subsequent level to the search module.

16. The search engine as described in claim 13, wherein the edit module has inputs and outputs from a neighboring search engine level to the search engine.

17. The search engine as described in claim 13, wherein the priority controller gives priority to a search operation over an edit operation.

18. The search engine as described in claim 13, wherein the priority controller accesses the address cache to provide parallel access.

19. The search engine as described in claim 18, wherein the priority controller receives a request to read a memory address of the memory, content of the memory address is copied to a first cache address and a second cache address of the address cache.

20. A computer system for providing a search, comprising:
a central controller suitable for implementing search and edit operations, the central controller suitable from inputting and outputting external communications; and
a plurality of search engines arranged in zero through k levels, wherein k level search engine of the plurality of search engines is communicatively coupled to the central controller and a zero level search engine of the plurality of search engines is communicatively coupled to the central controller, wherein the central controller performs parallel execution of a search operation and an edit operation through utilization of a binary search tree and at least one of the plurality of search engines;
wherein at least one of the search engines include a priority controller, memory, edit module, search module and address cache.

21. The system as described in claim 20, wherein the central controller and the plurality of search engines are communicatively coupled via a search connection, an edit connection and a cache connection.

22. The system as described in claim 20, wherein the priority controller manages access to the memory by the edit module, search module and cache module.

23. The system as described in claim 20, wherein the priority controller accesses data utilizing the address cache, the address cached configured to receive data from the memory.

24. The system as described in claim 20, wherein the edit module connects with the memory through the priority controller, the edit module configured to perform calculations for editing operations and wherein the search module is configured to perform calculation for a search operation.

25. The system as described in claim 24, wherein the search module is communicatively connected to a second search module of a second search engine position at a neighboring level, the second search engine positioned at least one of at a previous or subsequent level to the search module.

26. The system as described in claim 25, wherein the search engine is included in the zero level search engine, output of the search module is provided to the central controller and wherein the search engine is included in the k level search engine, the input of the search module is obtained from the central controller.

27. The system as described in claim 20, wherein the edit module has inputs and outputs from a neighboring search engine level to the search engine.

28. The system as described in claim 20, wherein the priority controller gives priority to a search operation over an edit operation.

29. The system as described in claim 20, wherein the priority controller accesses the address cache to provide parallel access.

30. The system as described in claim 29, wherein the priority controller receives a request to read a memory address of the memory, content of the memory address is copied to a first cache address and a second cache address of the address cache.

* * * * *